United States Patent [19]
Fairbanks

[11] 3,909,973
[45] Oct. 7, 1975

[54] SONIC FISHING LURES
[76] Inventor: Herbert K. Fairbanks, St. George, Maine
[22] Filed: Dec. 18, 1974
[21] Appl. No.: 533,863

[52] U.S. Cl. ............... 43/42.31; 43/17.1; 43/42.21
[51] Int. Cl.² .......................................... A01K 85/00
[58] Field of Search ..... 43/42.31, 17.1, 42.2, 42.21, 43/42.12

[56] References Cited
UNITED STATES PATENTS
2,833,078   5/1958   Peltz .................................. 43/42.31
2,853,826   9/1958   Romeo ............................... 43/42.31
3,296,733   1/1967   McLean ............................. 43/42.31

Primary Examiner—Warner H. Camp

[57] ABSTRACT

A fishing lure which emits sounds for attracting fish of various species to its vicinity includes a hollow spinner body having coacting resilient wires and plates mounted therein to provide the sounds when the body is rotated in water.

11 Claims, 7 Drawing Figures

U.S. Patent  Oct. 7, 1975  3,909,973
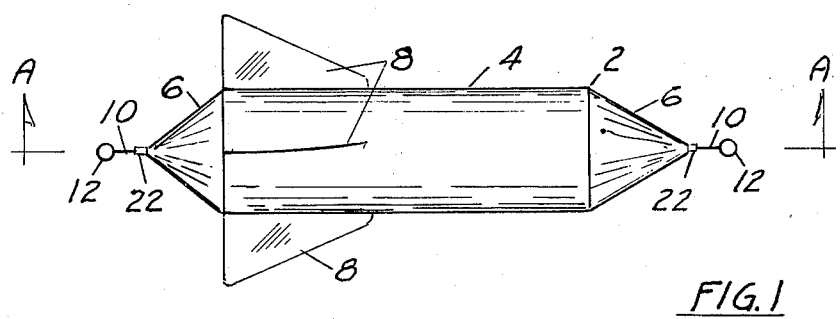
FIG. 1
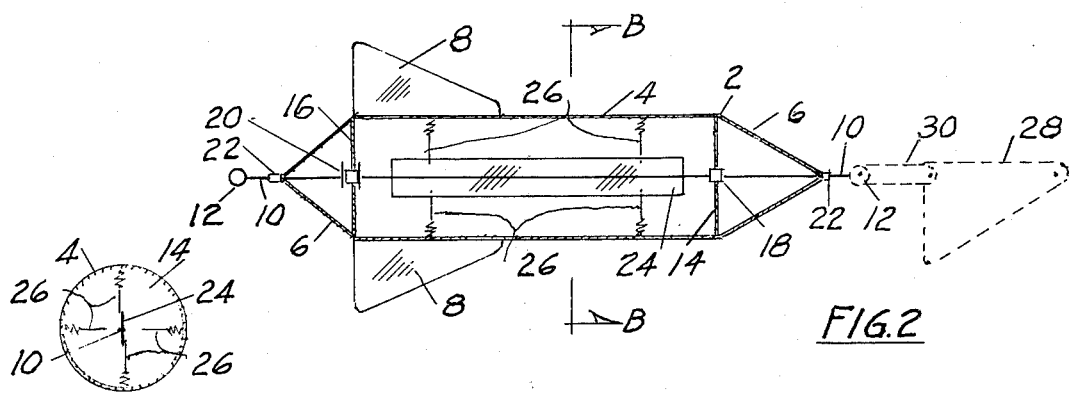
FIG. 3
FIG. 2
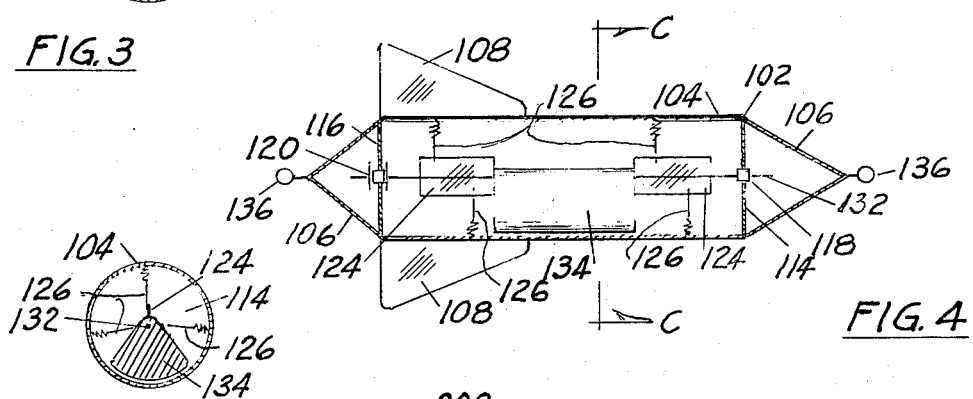
FIG. 5
FIG. 4
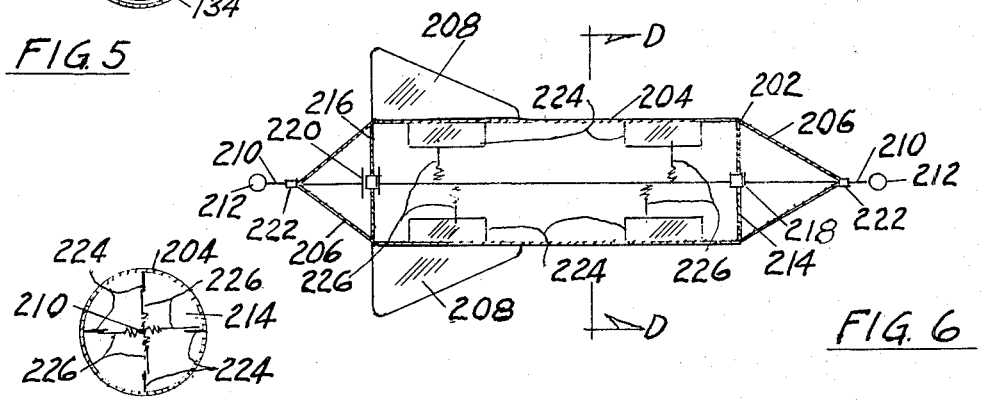
FIG. 7
FIG. 6

SONIC FISHING LURES

Artificial lures in common use by fishermen are of many different materials and of a wide variety of sizes and shapes. Such lures are usually of bright and shiny colours and are fashioned to move through the water in a manner as to induce the fish to strike. All such lures are generally limited in effectiveness to the range of vision of the fish which, under some water and weather conditions, is quite limited, or restricted. Accordingly, a primary objective of this invention is to provide a new or generally improved and more satisfactory fishing lure.

Another object of this invention is to provide a sonic fishing lure for attracting fish which may be beyond the range of vision of the fish from the lure or which may be in hiding and will be attracted to its vicinity.

A further object of this invention is to provide a sonic fishing lure which can be used alone or with conventional lures of a fisherman's choice.

A still further object of this invention is to provide a sonic fishing lure which is simple in construction, and easy and safe to use, and adapted to withstand rugged treatment.

A still further object of this invention is to provide a sonic fishing lure which is inexpensive and compact.

These and other objects will be more apparent by reference to the accompanying detailed description and drawing, in which:

FIG. 1 is a side view of one embodiment of this present invention;

FIG. 2 is a vertical section taken along the line A — A of FIG. 1;

FIG. 3 is a vertical section taken along the line B — B of FIG. 2;

FIG. 4 is a view similar to FIG. 2 illustrating the internal construction of a second embodiment of the invention;

FIG. 5 is a vertical section taken along the line C — C of FIG. 4;

FIG. 6 is a view similar to FIG. 2 illustrating the internal construction of a third embodiment of the invention; and FIG. 7 is a vertical section taken along the line D — D of FIG. 6.

With reference to FIGS. 1 - 3, the sonic fishing lure of the present invention includes an elongated hollow body 2 having a tubular section 4 and conical end walls 6. Fins 8 are fixed to the outer surface of the tubular section 4 and, as hereafter described, serve to impart a rotary movement to the hollow body 2 as the lure is drawn through a body of water. A shaft 10 extends longitudinally; that is, centrally through the body 2 and is formed with eyes 12 at its opposite ends.

As shown in FIG. 2, longitudinally spaced diaphrams or partition walls 14 and 16 are provided within the body 2 and carry bearings 18 and 20 which support the body 2 for free rotary movement relative to the shaft 10. Preferably, at least the bearing 20 is a thrust bearing which is fixed to the shaft 10 and rotates relative to the diaphram 16 so as to maintain the body 2 in a desired position on the shaft 10.

Suitable seals 22 are provided to prevent the entry of water into the body 2 without obstructing or retarding the desired rotation of such body 2 relative to the shaft 10.

Attached rigidly to the shaft 10 is a plate 24 which is designed to temporarily deflect or flick the free end portions of a series of resilient wires 26 which are fixed at their opposite ends to the inner surface of the tubular section 4. As best seen in FIG. 3, the resilient wires 26 extend generally radially toward the shaft 10. It will be appreciated that, as the body 2 is rotated relative to the shaft 10, the free end portions of the wires 26 are flicked by the edges of the plate 24: that is, the free end portions of the wires 26 are first temporarily deflected by the plate 24 and then pass over the edges of such plate. As a result of this action, the wires 26 assume a free oscillatory movement so that resonant sounds are created and transmitted to the medium surrounding the same. It will be understood that in lieu of a single plate 24, a multiple of such plates 24 may be fixed to the shaft 10 for flicking the free end portions of the resilient wires 26, as described.

The fishing lure of the present invention may be employed alone or with other lures and/or fishing gear. As shown in FIG. 2 a rudder 28 may be attached to one of the shaft eyes 12 by a bar 30, with the rudder serving to minimize rotation of the shaft 10. During use, with the lure attached to a fishing line and being drawn through a body of water, the fins 8 cause the body 2 to rotate relative to the shaft 10. With this rotation of the body 2 the free end portions of the resilient wires 26 flick across the edges of the plate 24 and assume free oscillatory movements. The resonant sounds which are thus created are transmitted by the surrounding water for comparatively long distances and attract fish to its vicinity. With a larger number of fish in the area of the fisherman's bait, the opportunity for a catch is certainly increased.

In the modification of the present invention shown in FIGS. 4 and 5 elements which correspond to those shown in FIGS. 1 - 3 are given like reference numbers but have been increased by 100. The essential difference between this structure and that heretofore described is that a shaft 132 is employed which is completely contained within the body 102 and a weight 134 is mounted eccentrically on such shaft 132 to minimize its rotation as the body 102 is rotated. In this instance eyes 136 are provided at opposite ends of the body 102 to facilitate its attachment to a fishing line. Except for the structural changes noted the lure shown in FIGS. 4 and 5 is the same in both construction and operation as that illustrated in FIGS. 1 - 3.

In the modification of the present invention shown in FIGS. 6 and 7 the elements which correspond to those shown in FIGS. 1 - 3 are given like reference numbers but have been increased by 200. The essential difference between this structure and that heretofore described is that plates 224 are rigidly attached to the inner surface of tubular body 204 and wires 226 are fixed to shaft 210. The wires 226 extend in generally radial directions outward from shaft 210 so that their free end portions are temporarily deflected by and then flick across the projecting edges of the plates 224 as the body 202 rotates relative to the shaft 210. As in the embodiment heretofore described, this action imparts free oscillatory movements to the resilient wires 226 so that resonant sounds are created and emitted from the lure. Except for the structural changes noted, the lure shown in FIGS. 6 and 7 is the same in both construction and operation as that illustrated in FIGS. 1 - 3. The embodiment shown in FIGS. 6 and 7 may, of course, be provided also with wires and a plate corresponding to the wires 26 and plate 24 of the structure shown in FIGS. 1 – 3.

If desired, an eccentrically mounted weight, such as shown at 134 in the structure shown in FIGS. 4 and 5, may also be employed in the embodiment shown in FIGS. 1 – 3 and FIGS. 6 and 7.

In the different embodiments described, the number of wires 26, 126, and 226, and their angular array may be varied. At least some of the wires in any of the described embodiments may vary in diameter so that sounds of different pitches are created as said wires flick across plates 24, 124 and 224. Likewise, the number of such plates 24, 124 and 224 may be varied and some of such plates may be of different lengths. In the structure shown in FIGS. 6 and 7 the circumferential spacing of the plates 224 may be varied as desired.

I claim:

1. A sonic fishing lure including an elongated, closed, hollow body, a shaft extending longitudinally of said hollow body, means supporting said hollow body for rotation relative to said shaft, means within said hollow body for creating resonant sound, said sound-creating means including a resilient wire fixed at one end to one of said hollow body and said shaft and a plate fixed to the other of said hollow body and said shaft, the free end portion of said resilient wire projecting so as periodically to engage with and be flicked by said plate as said hollow body is rotated relative to said shaft to thereby impart an oscillatory movement to said resilient wire and create resonant sound, and fins on the outside of said hollow body for causing the same to rotate when said lure is moved within a body of water.

2. A lure as defined in claim 1 wherein said resilient wire and said plate extend generally radially of said hollow body.

3. A lure as defined in claim 2 wherein said resilient wire is fixed at one end to the inner surface of said hollow body and extending generally radially thereof and said plate is fixed to said shaft.

4. A lure as defined in claim 3 wherein a plurality of said wires are fixed to the inner surface of said hollow body.

5. A lure as defined in claim 3 wherein said shaft extends through and projects beyond the ends of said hollow body, and means at one end of said shaft for attachment of said lure to a fishing line.

6. A lure as defined in claim 5 further including seals between said shaft and said body for maintaining said body watertight without obstructing the free rotation thereof relative to said shaft.

7. A lure as defined in claim 3 wherein a weight mounted eccentrically on said shaft at least minimizes rotation thereof.

8. A lure as defined in claim 7 wherein said shaft is completely contained within said body, and further includes means on said lure for attachment thereto of a fishing line.

9. A lure as defined in claim 2 wherein said resilient wire is fixed at one end to said shaft with its free end portion extending generally radially outward from said shaft and said plate is fixed to the inner surface of said body.

10. A lure as defined in claim 9 wherein a plurality of said wires are fixed to said shaft.

11. A lure as defined in claim 9 wherein a plurality of said plates are fixed to the inner surface of said hollow body and are adapted to engage with one or more of said plurality of resilient wires.

* * * * *